United States Patent [19]
Jackson

[11] 3,912,226
[45] Oct. 14, 1975

[54] CORNER STRAND BRAKE ASSEMBLY

[75] Inventor: Richard L. Jackson, Lewisburg, Ohio

[73] Assignee: Jackson Communication Corporation, Clayton, Ohio

[22] Filed: July 26, 1974

[21] Appl. No.: 492,059

[52] U.S. Cl. ............... 254/134.3 PA; 254/134.3 R
[51] Int. Cl.² .......................................... E21C 29/16
[58] Field of Search ............ 254/134.3 R, 134.3 PA, 254/61.5 M, 190; 242/151, 157; 24/81, 176; 188/65.3, 64, 65.1, 65.2

[56] References Cited
UNITED STATES PATENTS

| | | | |
|---|---|---|---|
| 2,938,678 | 5/1960 | Hrouat | 242/151 |
| 3,110,479 | 11/1963 | Eitel | 254/134.3 R |
| 3,260,507 | 7/1966 | Hughes | 254/134.3 R |
| 3,478,984 | 11/1969 | Landsem | 254/134.3 R |
| 3,672,636 | 6/1972 | Parsen | 254/134.3 R |
| 3,863,897 | 2/1975 | Yeager | 254/134.3 R |

FOREIGN PATENTS OR APPLICATIONS 1,104,834   6/1955   France ......................... 254/134.3 R

*Primary Examiner*—Othell M. Simpson
*Attorney, Agent, or Firm*—Biebel, French & Bugg

[57] ABSTRACT

A corner strand brake assembly includes a strand brake unit and a plurality of strand sheaves mounted in a corner block. Both the brake unit and strand sheaves are mounted on axles carried by the corner block and cooperate to guide a strand around a corner as it is pulled into place while preventing retrograde movement and hence, sag of the strand, between adjacent supporting poles.

10 Claims, 6 Drawing Figures

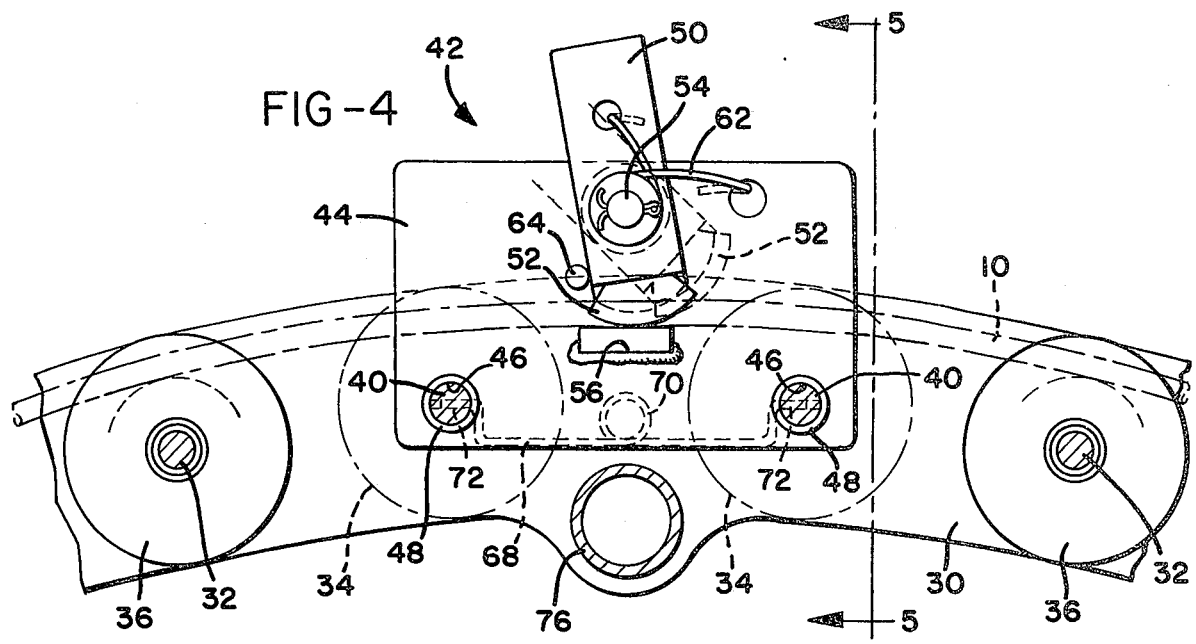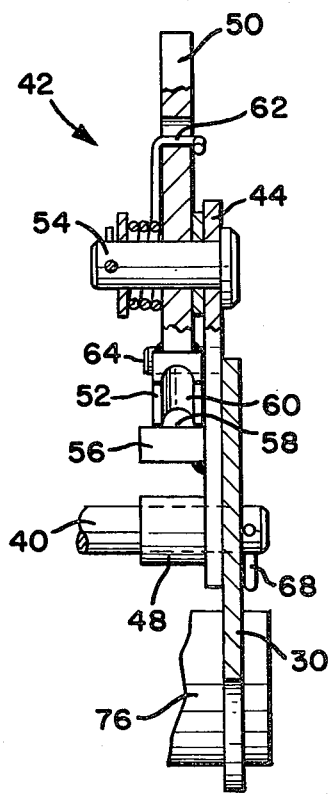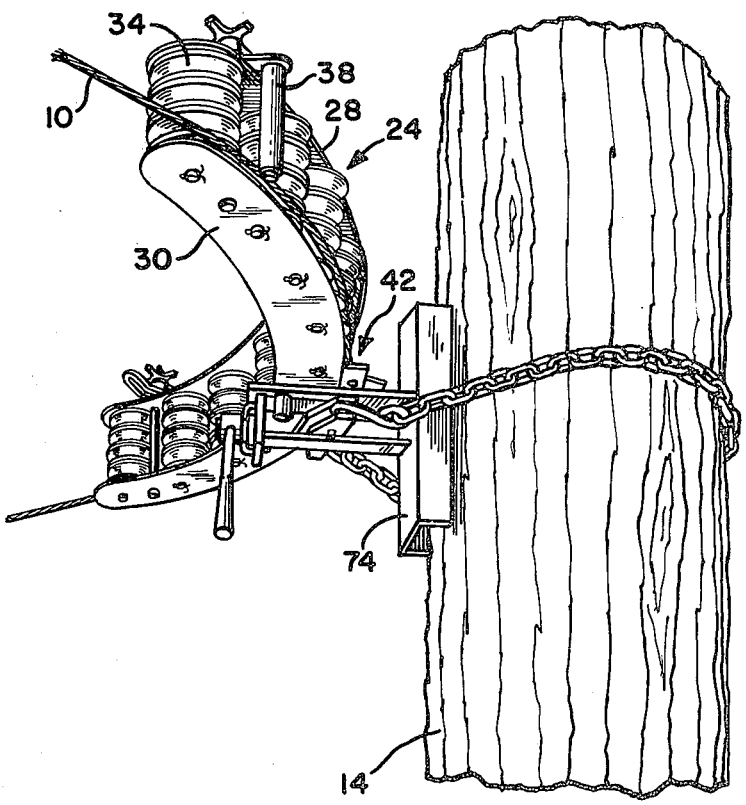

CORNER STRAND BRAKE ASSEMBLY

CROSS REFERENCE TO RELATED APPLICATION

STRAND BRAKE ASSEMBLY, Ser. No. 492,043, filed on July 26, 1974.

BACKGROUND OF THE INVENTION

As described in the above noted related application, in the installation of a messenger strand onto supporting poles, sag of the strand between adjacent poles presents a serious problem. If permitted, the strand may drop on parked cars or other objects beneath the strand and may also present an obstruction to traffic at points where the strand crosses highways, streets, or the like.

This is obviously a totally unacceptable situation at crossings over major highways as well as railroad crossings and presents some difficulties at river crossings. Additionally, if the strand is allowed to sag it can be blown against high voltage conductors and can be considered an attractive nuisance for children.

Various types of clamps and the like have been designed for gripping ropes, cables and conductors as exemplified by U.S. Pat. Nos. 1,898,677; 2,938,678; 3,204,309; and 3,364,529, some of which are intended specifically for use in the installation of power lines, conductors and other electrical lines.

Despite this, the most common practice followed in installing messenger strands is to position a lineman on a pole to manually loosen and tighten a pole mounted clamp through which the strand is trained during the pulling operation. This requires a relatively high degree of coordination between the lineman and the other members of the crew installing the strand and, despite the fact that a lineman is positioned on the pole, the strand often can be inadvertently allowed to sag. In some instances, this has resulted in accidents where a vehicle engages a sagging strand or begins to pass beneath the strand just as the strand sags down into the roadway.

SUMMARY OF THE INVENTION

The present invention provides a corner strand brake assembly which utilizes a brake unit and a plurality of strand sheaves, preferably constructed of steel, which are mounted in a corner block to form a corner strand brake assembly which can be mounted in a conventional manner on a supporting pole at a corner. The sheaves and brake unit thus cooperate to guide a strand being pulled into position around a corner while preventing retrograde movement of the strand in a direction opposite to the direction of pull when tension is relaxed on the strand.

The brake unit itself preferably includes a base plate having a pair of openings formed therethrough and spacer bushings mounted on one surface of the base plate with the openings through the bushings aligned with the openings in the base plate. The base plate may then be slipped onto a pair of adjacent axles, usually the center pair of the corner block, and the steel sheaves are mounted on the remaining axles of the corner block in substantial alignment with the brake unit. This may be accomplished readily by simply withdrawing the axles partially -- sufficient to install the strand sheaves and base plate onto the axles and replacing the axles.

A brake lever is pivotally mounted on the base plate and carries a brake shoe on one end having a grooved, strand engaging surface facing an opposing strand engaging surface on a backing member which is fixed by welding or the like to the base plate. Preferably a spring is provided urging the brake shoe into strand braking relationship with the backing member and a stop pin projects from the base plate for engagement by the brake lever to prevent overtravel of the brake shoe past the backing member.

Thus, the present invention provides a corner strand brake assembly which is simple, efficient and effective to prevent strand sag at a corner during a strand pulling operation.

BRIEF DESCRIPTION OF THE DRAWINGS

FIG. 4 is a side view of the brake assembly with parts removed for clarity;

FIG. 5 is a cross sectional view taken on line 5—5 of FIG. 4; and

FIG. 6 is a perspective view of a pole mounted corner strand brake assembly.

DESCRIPTION OF THE PREFERRED EMBODIMENTS

Figure 1:
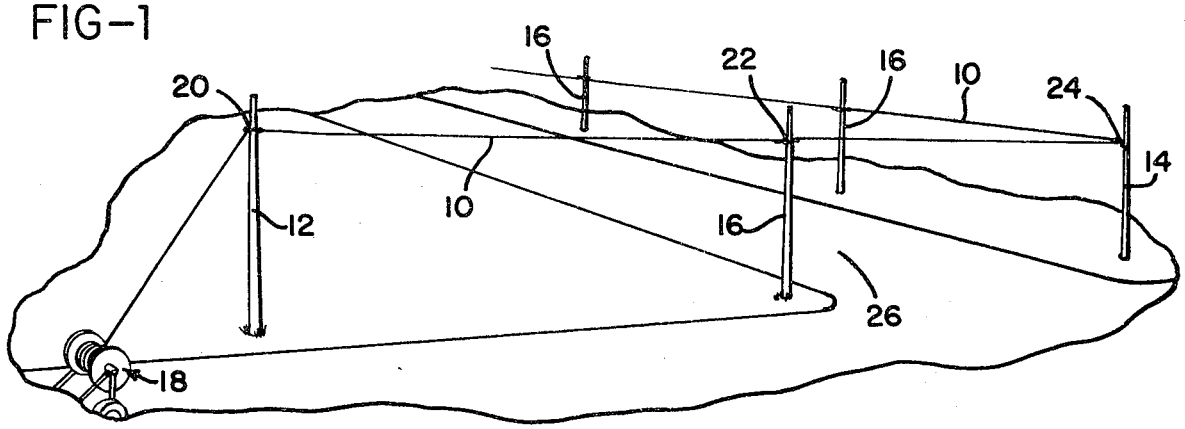
FIG. 1 is a perspective view showing a typical strand pulling operation at a corner.

As seen in FIG. 1 of the drawings, a typical strand pulling operation involves attaching a strand 10 to a series of supporting poles, including an initial pole 12, a corner pole 14 and a series of additional poles 16. The strand 10 is unreeled from a reel 18 and passed over a sheave or the like 20 at the pole 12, and thence through strand clamps 22 on the poles 16, which may also be provided with strand brake assemblies in accordance with the above noted related application.

At the pole 14 it is required that the strand 10 be turned, 90° as shown in FIG. 1, although it will be apparent that the degree of turn will vary with the particular installation. In any case, in accordance with the present invention a strand brake assembly 24 is mounted on the pole 14 to guide the strand around the corner and provide a corner strand brake against retrograde movement of the strand to thereby prevent the strand from sagging into a roadway 26 beneath the strand.

Figure 3:
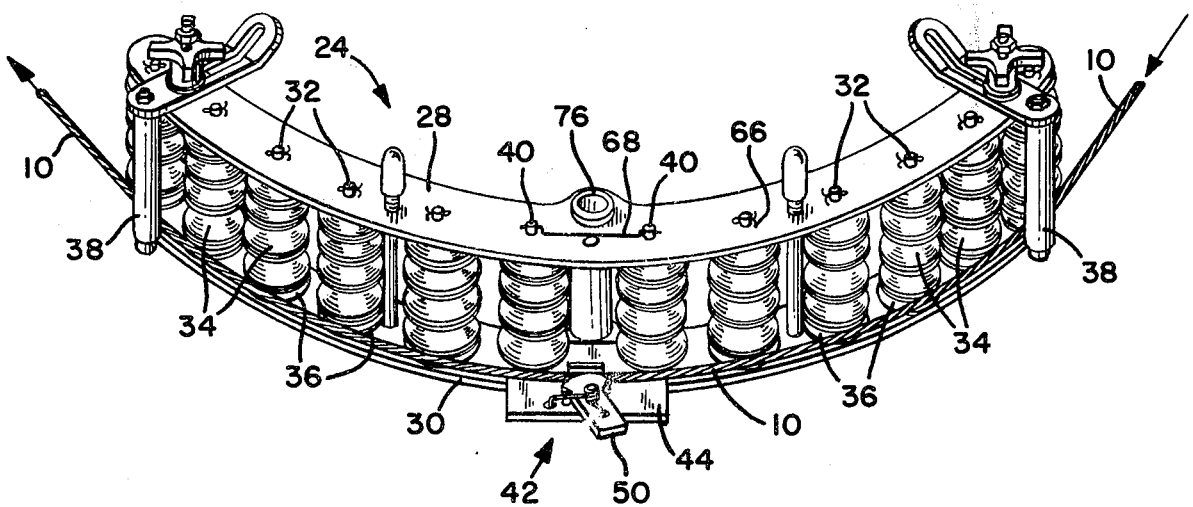
FIG. 3 is a perspective view of the corner strand brake assembly.

The strand brake assembly 24, as best seen in FIG. 3 of the drawings, may include a corner block including top and bottom arcuate side plates 28 and 30 forming a supporting framework and carrying a plurality of axles 32 therein. The block shown in FIG. 3 is a 90° block, having twelve axles extending between the side plates, although it will be apparent that blocks of other arcuate extent, such as a 45°, may also be utilized in accordance with the present invention.

For normal usage in installing relatively large coaxial cables, each of the axles is provided with a plurality of cable sheaves 34 having relatively large diameter cable receiving grooves formed in the surface thereof for guiding several cables simultaneously around corners during a cable stringing operation.

For guiding messenger strand 10, however, a series of strand sheaves 36 are provided, ten being shown in FIG. 3 of the drawings, and each having a strand receiving groove of relatively small diameter formed therein. The strand receiving grooves of the strand sheaves 36 lie in substantially the same plane and serve to guide a strand in an arcuate path in the direction indicated by the arrow in FIG. 3 of the drawings.

While the cable sheaves 34 are preferably of molded plastic construction, the strand sheaves 36 are preferably formed of steel. Conventional idlers 38 may also be mounted on the frame and will assist in retaining the strand 10 on the strand sheaves 36.

Figure 2:
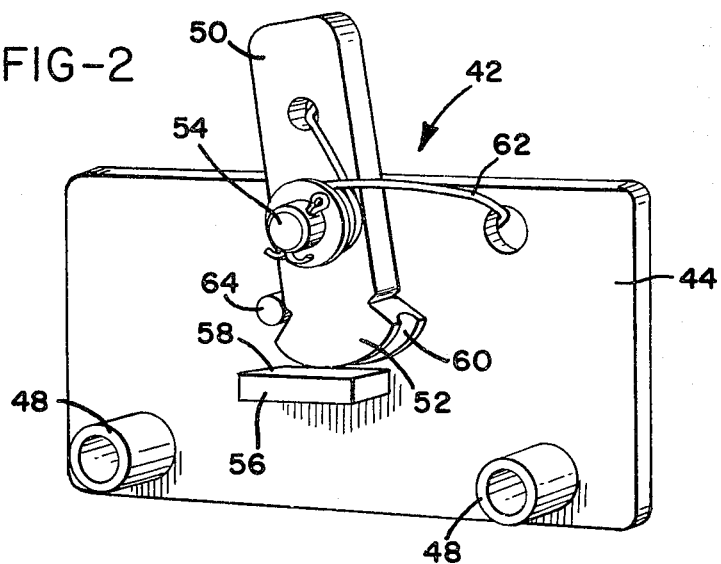
FIG. 2 is a perspective view of the brake unit.

A pair of adjacent axles 40 positioned at the center of the assembly receive a strand brake unit 42 in accordance with the present invention. The strand brake unit, as best seen in FIGS. 2 and 4 of the drawings, includes a base plate 44 having a pair of openings 46 formed therethrough and a pair of spacer bushings 48 mounted on one surface of the base plate with the openings through the bushings 48 aligned with the openings 46.

Also mounted on the base plate is a brake lever 50 carrying a brake shoe 52 at one end thereof and pivotally mounted on the base plate by means of a clevis pin 54. A backing member 56 is attached to the plate 44 by welding or the like and provides a strand engaging surface 58 positioned oppositely a grooved strand engaging surface 60 of the brake shoe 52.

The brake lever and shoe 50, 52 comprise a brake member which is urged by a spring 62 to bring the brake shoe 52 into braking engagement with the backing member 56. A stop pin 64 is also mounted on the plate 44 and engaged by the brake lever 50 to prevent overtravel of the brake member past the strand braking position.

To install the brake unit 42 and strand sheaves 36 in the corner block, axles 32 and center axles 40 are partially withdrawn from the lower side plate of the arcuate frame and the sheaves and brake unit slipped over the axles 32 and 40 with the axles 40 being received through the bushings 48 and openings 46 in the base plate.

Conventionally, the ends of the axles will be provided with cotter pins, as at 66, which must be removed before withdrawing the axles partially. However to facilitate removal and replacement of the axles, spring clips 68 may be utilized having a central looped portion 70 and a pair of end portions 72 received in the openings formed in the ends of the axles which are normally occupied by cotter pins.

As seen in FIG. 6 of the drawings, the corner strand brake assembly 24 can be mounted on the pole 14 by a mounting bracket 74 which includes an upstanding swivel pin (not shown) received in a tubular socket 76 extending between the side plates 28 and 30. This allows the corner block to automatically align itself during the strand pulling operation at the corner defined by the pole 14.

It should also be noted that at the pole 12, rather than utilizing a sheave 20 for guiding the strand upwardly from the reel, a corner strand brake assembly may be utilized instead with the socket 76 receiving a horizontally oriented swivel pin rather than a vertically oriented swivel pin.

In either case, the strand 10 is guided about the sheaves 36 and between the brake shoe 52 and the backing member 56 with the brake member urged into braking relationship with the backing member by the spring 62 as the cable is pulled in a direction indicated by the arrows in FIGS. 3 and 4 of the drawings. It will be apparent that the brake unit 42 does not interfere with the free passage of the strand through the assembly as it is pulled into position.

Should there be a relaxation of the pulling tension on the strand, however, after a slight retrograde movement of the strand, the brake shoe 52 will move into braking relationship with the backing member 56, gripping the strand therebetween and preventing retrograde movement of the strand and consequently, sagging thereof.

The thickness of the base plate 44 and the length of the spacer bushings 48 are such that the strand receiving grooves and the sheaves 36 are substantially coplanar with the strand engaging surfaces of the shoe 52 and backing member 56, with the strand sheaves 36 and brake unit 42 held in position by the cable sheaves 34 and the lower side plate 30. After the strand pulling operation has been completed, and the installation of cable is to begin, the sheaves 36 and brake unit 42 may be removed, if desired, and the resulting assembly utilized as a cable corner block.

In any case, it will be seen that the corner strand brake assembly in accordance with the present invention provides a system for guiding strand around corners while simultaneously providing a braking action against retrograde movement and thereby eliminating strand sag.

While the form of apparatus herein described constitutes a preferred embodiment of the invention, it is to be understood that the invention is not limited to this precise form of apparatus, and that changes may be made therein without departing from the scope of the invention.

What is claimed is:

1. A corner strand brake assembly comprising:
   a. a supporting framework,
   b. a plurality of axles mounted in said framework in spaced parallel relationship to each other,
   c. a plurality of strand sheaves mounted on said axles with strand engaging surfaces of said sheaves lying in substantially the same plane,
   d. said spaced parallel axles of said sheaves extending substantially perpendicularly to an arc of a circle positioning said strand engaging surfaces of said strand sheaves to define an arcuate strand path,
   e. a base member mounted on said supporting framework intermediate a pair of strand sheaves,
   f. a backing member having a strand engaging surface mounted on said base member and disposed along said arcuate strand path,
   g. brake means mounted on said base member and having a strand engaging surface, and
   h. means mounting said brake means for movement of said strand engaging surface thereof toward and away from said strand engaging surface of said backing member for braking a strand therebetween upon movement of the strand in one direction.

2. The assembly of claim 11 wherein:
   a. said base member is mounted on said supporting framework by means of some of said axles.

3. The assembly of claim 2 wherein:
   a. said base member has openings therethrough receiving some of said axles.

4. The assembly of claim 3 further comprising:

a. spacer bushings mounted on said base member with openings through said bushings substantially aligned with said openings in said base member.
5. A corner strand brake assembly comprising:
   a. a supporting framework,
   b. a plurality of axles mounted in said framework in spaced parallel relationship to each other,
   c. a plurality of strand sheaves mounted on said axles with strand engaging surfaces of said sheaves lying in substantially the same plane,
   d. a base member mounted on said supporting framework intermediate a pair of strand sheaves,
   e. brake means pivotally mounted on said base member,
   f. means cooperating with said brake means for braking a strand supported by said strand sheaves upon movement of the strand in one direction, and
   g. a plurality of cable sheaves mounted on said axles with cable engaging surfaces of said cable sheaves extending substantially parallel to said strand engaging surfaces of said strand sheaves.
6. The assembly of claim 12 wherein:
   a. said cable engaging surfaces of said cable sheaves comprise relatively large diameter grooves formed in said cable sheaves, and
   b. said strand engaging surfaces of said strand sheaves comprise relatively small diameter grooves formed in said strand sheaves.
7. The assembly of claim 11 wherein:
   a. said brake means and said means cooperating therewith have opposed strand engaging surfaces lying in substantially the same plane as said strand engaging surfaces of said strand sheaves.
8. The assembly of claim 11 further comprising:
   a. spring means urging said brake means into strand braking relationship with said means cooperating therewith.
9. The assembly of claim 11 further comprising:
   a. stop means engageable by said brake means for preventing overtravel thereof.
10. A corner strand brake assembly comprising:
    a. a pair of arcuate side plates extending in spaced parallel relationship to each other,
    b. a plurality of axles mounted in said side plates and extending therebetween in regularly spaced, parallel relationship to each other,
    c. each of said axles having journalled thereon a plurality of cable sheaves having relatively large diameter, cable receiving grooves formed therein,
    d. all but two adjacent axles of said plurality thereof having journalled thereon strand sheaves having relatively small diameter strand receiving grooves formed therein,
    e. a base plate,
    f. means defining a pair of openings through said base plate,
    g. a pair of spacer bushings mounted on and projecting from a surface of said base plate with openings through said bushings aligned with said openings in said base plate,
    h. said two adjacent axles being received in said aligned openings in said spacer bushings and said base plate,
    i. a spring clip having opposite ends received in openings in outer ends of said pair of adjacent axles for retaining said pair of adjacent axles in said side plates,
    j. a backing member having a strand engaging surface mounted on and projecting from said surface of said base plate,
    k. a brake lever pivotally mounted on said base plate,
    l. a brake shoe mounted on an end of said brake lever and having a grooved strand engaging surface disposed oppositely to said strand engaging surface of said backing member when said backing member and brake shoe are in strand braking relationship to each other,
    m. said strand engaging surfaces of said backing member and said brake shoe being substantially coplanar with said strand receiving grooves of said strand sheaves,
    n. spring means urging said brake shoe into strand braking relationship with said backing member, and
    o. a stop pin projecting from said surface of said base plate and engageable by said brake lever to prevent over travel of said brake shoe past said strand braking relationship with said backing member.

* * * * *

UNITED STATES PATENT AND TRADEMARK OFFICE
CERTIFICATE OF CORRECTION

PATENT NO. : 3,912,226
DATED : October 14, 1975
INVENTOR(S) : Richard L. Jackson It is certified that error appears in the above–identified patent and that said Letters Patent are hereby corrected as shown below:

Column 4, line 62, "11" should be --- 1 ---.

Column 5, line 22, "12" should be --- 5 ---.

Column 5, line 29, "11" should be --- 1 ---.

Column 5, line 34, "11" should be --- 1 ---.

Column 5, line 38, "11" should be --- 1 ---.

Signed and Sealed this second Day of March 1976

[SEAL]

Attest:

RUTH C. MASON
*Attesting Officer*

C. MARSHALL DANN
*Commissioner of Patents and Trademarks*